Oct. 7, 1930.  B. J. CURTIS ET AL  1,777,293
LIQUID MEASURING DEVICE
Filed Dec. 20, 1926  2 Sheets-Sheet 1
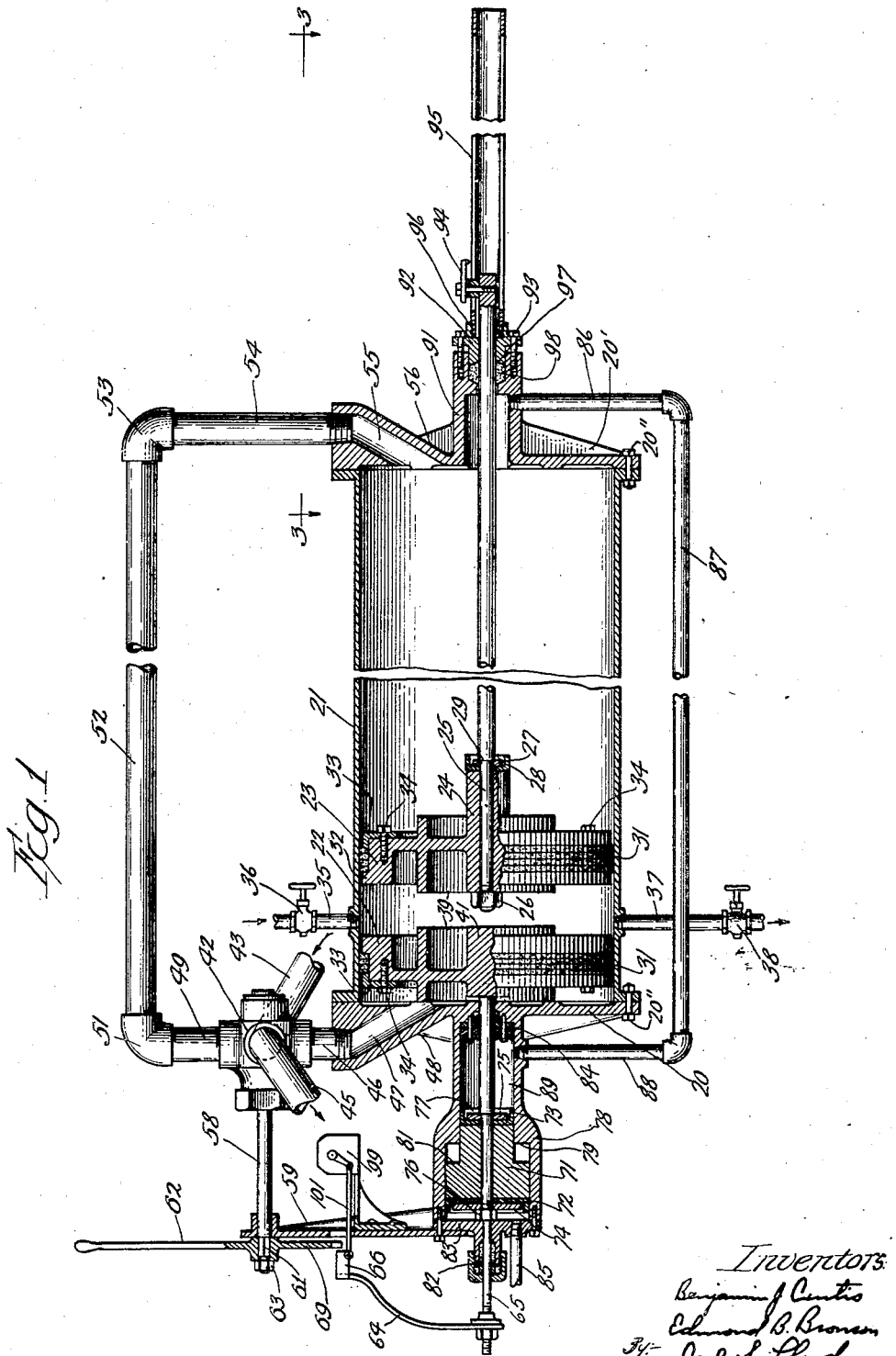

Oct. 7, 1930. B. J. CURTIS ET AL 1,777,293
LIQUID MEASURING DEVICE
Filed Dec. 20, 1926 2 Sheets-Sheet 2
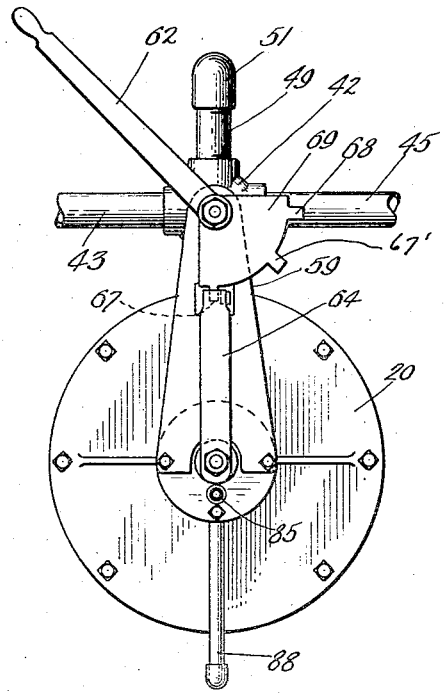
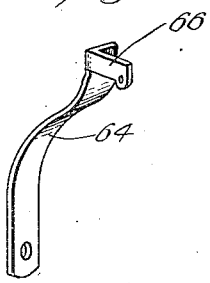
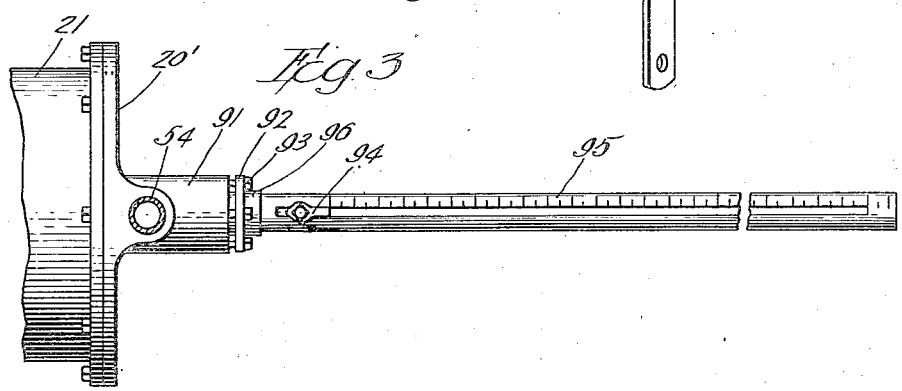
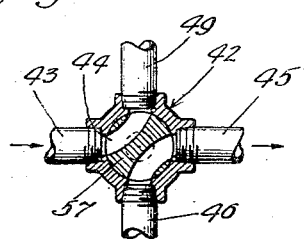

Patented Oct. 7, 1930

1,777,293

UNITED STATES PATENT OFFICE

BENJAMIN J. CURTIS, OF CHICAGO, AND EDMOND B. BRONSON, OF BLUE ISLAND, ILLINOIS; MINNIE E. BRONSON EXECUTRIX OF SAID EDMOND B. BRONSON, DECEASED

LIQUID-MEASURING DEVICE

Application filed December 20, 1926. Serial No. 155,993.

This invention relates to liquid measuring devices and an important object thereof is the provision of a device of this character adapted to be operated hydraulically under the pressure of the liquid to be measured and also using liquid as a means for effecting adjustment of the operating elements to thereby regulate the amount of water, or other liquid, delivered by the device in a single charge.

The invention also provides efficient mechanism for maintaining a control valve in desired relation during the operation of the device and preventing reversal of the flow in said valve except when required for the proper functioning of the apparatus, thus insuring uniformity in the charges delivered.

Another object of the invention is the provision of valve operating means which will permit the control of the flow through the valve so that it may be admitted to the cylinder more or less rapidly as conditions may render desirable.

Further objects are the provision, in the relation specified in the claims, of an indicator whereby the quantity of liquid in each charge, or, in other words, the condition of adjustment of the apparatus, may be readily observed, and the provision, in conjunction therewith, of a counting device for registering the number of charges delivered.

Other objects and advantages of the invention will be apparent as it is better understood from the following description, which, taken in connection with the accompanying drawings, discloses a preferred embodiment thereof.

Referring to the drawings,

Figure 1 is a vertical sectional and elevational view of the measuring cylinder and associated mechanism in which our invention is embodied;

Fig. 2 is an end elevation thereof, showing particularly the valve operating lever and control therefor;

Fig. 3 is a plan view, illustrating the indicator in detail;

Fig. 4 is a sectional view of the four-way valve for controlling the flow of liquid to and from the measuring cylinder; and Fig. 5 is a detail view of the valve control member, shown in perspective.

Upon said drawings, illustrating the best manner in which we have thus far contemplated applying the principles of our invention, the reference character 21 indicates a cylinder in which a piston composed of two sections 22 and 23 is mounted for floating movement, the section 23 having a hub portion 24 through which a rod 25 extends and to which it is secured by means of a nut 26 threaded upon the inner end of said rod, which protrudes into the space between said piston sections. A washer 27 disposed within a cup 28 at the opposite end of the hub 24 is arranged upon the rod 25 inwardly from a shoulder 29 and cooperates with the nut 26 in securing said rod to the piston section mentioned. End plates 20 and 20' are secured by bolts 20'' to opposite ends of said cylinder 21.

Piston rings, or any suitable packing 31, may be secured upon the periphery of the piston sections 22, 23 and held in place between an integral flange 32 and a flanged ring 33 secured to the outer face of said piston sections by screws 34.

It will be noted that said sections are not connected and the piston displacement may therefore be regulated by admitting liquid to the space between said sections 22 and 23, or withdrawing it therefrom. For this purpose, we provide an inlet pipe 35, having a valve 36 therein, and also a drain pipe 37 in which there is provided a manually controllable valve 38. These pipes are so arranged that adjustment of the piston sections may be made when the piston is at the left-hand end of its stroke, viewing Fig. 1. Said sections are formed with annular webs 39 protruding longitudinally beyond the peripheral portions of said sections and holding the latter always sufficiently separated to permit the water to flow into or from the space therebetween. The protruding end of the rod 25, if the latter be arranged to protrude, will hold said sections even further apart, when the liquid is exhausted, since it will engage a hub part 41 of the section 22. Since the piston when in operation is under pressure from opposite sides, it will move as a unit, the sections being as close together as is permitted by the amount of liquid therebetween.

The liquid, which in the adaptation of the invention primarily though not exclusively contemplated will be water from a service line, is admitted through a four-way valve 42. An inlet pipe 43 leads into the chamber 44 of said valve and an outlet pipe 45 leads therefrom at the opposite side. A pipe 46 leads to a passage 47 in a projection 48 at one end of the cylinder and communicates with the interior of the cylinder. Another pipe 49 leads through an elbow 51, horizontal pipe 52, elbow 53 and vertical pipe 54, to a passage 55 in a projection 56 corresponding to the projection 48 and arranged on the opposite end of the cylinder.

The flow of water through said valve is adapted to be controlled by means of a rotatable member 57 mounted in the valve chamber 44 and carried upon a rod 58 extending through a frame part 59 and having a square end 61 upon which is secured a hand lever 62, held in place by a nut 63. The extreme positions of said lever, as shown, are 90° apart and when the lever is on one side of center the water is admitted to the pipe 49, the valve being opened to the pipe 46 when said lever is on the other side of center. Obviously, when the inlet pipe is connected with one or the other of said pipes 49 or 46, the outlet pipe is connected with the other thereof. Thus when the water is admitted from the left end of the cylinder through the pipe 46, the piston is forced toward the right, expelling the water from the cylinder through the pipes 54, 52, 49, the valve 42 and the outlet pipe 45. The valve member 57 is then turned and the action is reversed, the water being admitted through the pipes 49, 52 and 54, forcing the piston to the left and expelling the contents of the cylinder through the pipe 46, valve 42 and outlet pipe 45. The cylinder is therefore always full of water and each incoming charge serves to expel a measured amount from the apparatus.

As hereinabove indicated, provision is made for preventing reversal of the valve member 57 except at the end of each stroke of the piston. This is accomplished by means of an arm 64, carried upon a rod 65 and having an inwardly extending projection 66 at the top thereof adapted to control the operation of the lever 62 in a manner which will presently appear. A quadrant 69, rigid with the lever 62, is provided with a central lug 67' and, if desired, corner lugs 67 and 68. Said projection 66 in the arm 64, when the latter is in its effective position, is adapted to be engaged by said central lug 67' on said quadrant when it is attempted to turn the lever 62 past center and thus reverse the flow through the valve, said arm being moved into and out of effective position as will now be described.

The rod 65 has secured thereto a piston 71, held between cup members 72 and 73, within which are washers 74 and 75 held in place respectively by a nut 76 and a shoulder 77 on the rod 65. Said piston 71 is mounted in a small cylinder 78 formed integrally with or secured to one end of the cylinder 21 and is shouldered interiorly, as indicated at 79, the piston being correspondingly shouldered at 81. A packing gland 82 is provided upon an end plate 83 of the cylinder 78, through which the rod 65 passes and suitable packing and washers, indicated at 84, are provided at the inner end of said cylinder, through which said rod extends into the cylinder 21. The piston 71 is normally held in its innermost or seated position by means of water pressure admitted through a pipe 85 and in this position the arm 64 is held in obstructing or effective position. When, however, the piston reaches the left end of its stroke, as shown in Fig. 1, the rod 65 is moved to the left by pressure of the hub of the piston section 22 against the end of said rod which extends into the cylinder 21. This moves the arm 64 out of obstructing position and the lever 62 may be manipulated to reverse the flow through the valve. The rate of flow into the cylinder may be controlled by setting said lever 62 at any desired position between the center and extreme positions beyond which it is prevented from moving by the lug 67' and one or the other of the lugs 67 and 68 on the quadrant 69. It will be understood that the lug 67' is arranged on one side or the other of the arm 64, according to direction of flow desired, the change of position being effected, manually or automatically, when the arm 64 is in its out position, As soon as the piston 22, 23 starts on its stroke in the opposite direction, the arm 64 obviously is moved back by the pressure of the water in the pipe 85 to locking position, where it remains until the said piston reaches the opposite ends of its stroke, when water, forced through pipes 86, 87 and 88 into a chamber 89 in the cylinder 78 behind the piston 71, again unseats said piston with the result above described. It will be noted that the pipe 86 leads out from a hollow projection 91 on the right end of the cylinder 21 and the pressure therein is produced when the cup 28 enters said hollow projection. The lever 62 is again manipulated and upon return of the piston 22, 23 toward the left, the pressure in the pipe 85 seats the piston 71, the pressure on the opposite side thereof having been relieved.

The rod 25 extends through the hollow projection 91 and through an end plate 92 secured thereto by screws 93 and carries on its outer end an indicator 94 movable in a slotted tube 95, which is graduated on top as indicated in Fig. 3. Said tube is screwed into a socket 96 on said end plate and said plate has an inward projection extending into a recess 97 in the end of the projection 91, packing 98 being provided in said recess. Obviously, by observing said indicator at the opposite ends of the stroke of the piston 22, 23, the adjusted capacity of the cylinder may be read. Of course, other forms of indicator could be employed if preferred.

A counter 99, of any well known or approved construction, may be connected by rods 101 with the projection 66 on the locking arm 64 so that the number of piston strokes may be counted.

While the device is adapted for a variety of uses, a particular use contemplated is for supplying measured charges of water to concrete mixers. By the use of our apparatus, the amount of water entering into each batch may be accurately controlled and furthermore the extent of operation of the mixer may be recorded. Since a charge of water is expelled on the back as well as the forward stroke of the piston 22, 23, two concrete mixers may well be served by the same apparatus, in which case a three-way valve should, of course, be placed in the outlet pipe 45, the same to work in conjunction with the valve 42 and lever 62.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

We claim:

1. A liquid measuring device comprising a cylinder, means for admitting liquid under pressure to opposite ends of said cylinder alternately, a piston in said cylinder adapted to be operated by the pressure of said liquid and being adjustable whereby the displacement thereof may be varied, an outlet conduit alternately communicating with the opposite ends of said cylinder, and means comprising a valve operating member and a locking member therefor operable by the piston at opposite ends of its stroke for reversing the flow of the liquid through said cylinder.

2. A liquid measuring device comprising a cylinder, means for admitting liquid under pressure to opposite ends of said cylinder alternately, a piston in said cylinder adapted to be operated by the pressure of said liquid, said piston comprising separate sections, means for admitting liquid to the space between said sections or withdrawing it therefrom to vary the displacement of the piston, and an outlet conduit alternately communicating with the opposite ends of said cylinder.

3. A liquid measuring device comprising a cylinder, means for admitting liquid under pressure to opposite ends of said cylinder alternately, a piston in said cylinder adapted to be operated by the pressure of said liquid, said piston comprising separate sections, means for admitting liquid to the space between said sections or withdrawing it therefrom to vary the displacement of the piston, and an outlet conduit alternately communicating with the opposite ends of said cylinder, said piston sections being formed so that the peripheral portions thereof are always spaced apart and the means for admitting or withdrawing the liquid being arranged to communicate with the space between said sections when the piston is at one end of its stroke.

4. A liquid measuring device comprising a cylinder, a piston movable therein under pressure of liquid entering the cylinder, a valve for controlling the admission and discharge of the liquid, a valve operating member, means for limiting the movement of said valve operating member to prevent operation thereof to reverse the flow through the valve, and means operable by the piston at either end of its stroke for rendering said limiting means ineffective so that said valve operating member may be operated to permit reversal of flow through said valve.

5. A liquid measuring device comprising a cylinder, a piston movable therein under pressure of liquid entering the cylinder, a valve for controlling the admission and discharge of the liquid, a valve operating member, means for limiting the movement of said valve operating member to prevent operation thereof to reverse the flow through the valve, and means operable by the piston at either end of its stroke for rendering said limiting means ineffective so that said valve operating member may be operated to permit reversal of flow through said valve, said means comprising an auxiliary cylinder, a piston therein, a member associated with said piston for engaging said valve operating member to limit the movement thereof, means normally maintaining a pressure on said last-mentioned piston to hold the same in limiting position, said pressure being adapted to be overcome by action of the main piston as the latter approaches each end of its stroke.

6. A liquid measuring device comprising a cylinder, a piston movable therein under pressure of liquid entering the cylinder, a valve for controlling the admission and discharge of the liquid, a valve operating member, means for limiting the movement of said valve operating member to prevent operation thereof to reverse the flow through the valve, and means operable by the piston at either end of its stroke for rendering said limiting means ineffective so that said valve operating member may be operated to permit reversal of flow through said valve, said means comprising an auxiliary cylinder, a piston therein, a member associated with said piston for engaging said valve operating member to limit the movement thereof, means normally maintaining a pressure on said last-mentioned piston to hold the same in limiting position, said pressure being adapted to be overcome by action of the main piston as the latter approaches either end of its stroke, the main piston acting mechanically upon said auxiliary piston at one end of its stroke and hydraulically at the other end.

7. A liquid measuring device comprising a cylinder, means for supplying liquid to said cylinder, a piston movable therein for expelling the liquid, and hydraulic means for adjusting said piston to vary the displacement thereof.

8. A liquid measuring device comprising a cylinder, means for supplying liquid thereto, a piston comprising separable parts movable together in said cylinder to expel the liquid therefrom in measured quantities, and means for admitting liquid to a space between said separable parts of the piston the latter being relatively movable under the pressure of the liquid so admitted to vary the displacement of the piston.

9. A liquid measuring device comprising a cylinder, a piston movable therein under pressure of liquid entering the cylinder, a valve for controlling the admission and discharge of the liquid, a valve operating member, means for limiting the movement of said valve operating member to prevent operation thereof to reverse the flow through the valve, means operable by the piston at either end of its stroke for rendering said limiting means ineffective so that said valve operating member may be operated to permit reversal of flow though said valve, and a counter operable by said limiting means for registering the number of charges discharged from said cylinder.

10. A device for supplying water in measured quantities to a concrete mixer or the like comprising a cylinder, means for communicably connecting said cylinder with a source of water under pressure, a piston movable in said cylinder under pressure of the water from said source, said piston comprising separate sections adjustable by hydraulic pressure, and a conduit for connecting said cylinder with the mixer or the like to be served.

11. A liquid measuring device comprising a cylinder, a piston movable therein under pressure of liquid entering the cylinder, a valve for controlling the admission and discharge of the liquid, a valve operating member, means for limiting the movement of said valve operating member to prevent operation thereof to reverse the flow through the valve, and means operable by the piston at either end of its stroke for rendering said limiting means ineffective so that said valve operating member may be operated to permit reversal of flow through said valve, said operating member being arrangeable in various positions to control the rate of flow into the cylinder.

12. A liquid measuring device comprising a cylinder, a piston movable therein under pressure of liquid admitted to the cylinder, valve means for controlling the admission and discharge of the liquid, valve operating devices, means for locking said devices to prevent operation thereof except under predetermined conditions, and means operable by the piston at either end of its stroke for releasing said locking means so that said valve operating devices may be operated to reverse the flow of liquid through the cylinder.

In witness whereof, we hereunto subscribe our names to this specification.

BENJAMIN J. CURTIS.
E. B. BRONSON.